(12) United States Patent
Peng (10) Patent No.: US 9,864,492 B2
(45) Date of Patent: Jan. 9, 2018

(54) AFFINITY-BASED INTELLIGENCE PROMPTER

(71) Applicant: SAP SE, Walldorf (DE)

(72) Inventor: Yu Jun Peng, Shanghai (CN)

(73) Assignee: SAP SE, Walldorf (DE)

( * ) Notice: Subject to any disclaimer, the term of this patent is extended or adjusted under 35 U.S.C. 154(b) by 434 days.

(21) Appl. No.: 14/135,529

(22) Filed: Dec. 19, 2013

(65) Prior Publication Data

US 2015/0178356 A1  Jun. 25, 2015

(51) Int. Cl.
*G06F 3/0484* (2013.01)
*G06F 17/24* (2006.01)

(52) U.S. Cl.
CPC ........ *G06F 3/04842* (2013.01); *G06F 17/243* (2013.01)

(58) Field of Classification Search
IPC .......................... G06F 17/30457; G06T 11/206
See application file for complete search history.

(56) References Cited

U.S. PATENT DOCUMENTS

| | | | |
|---|---|---|---|
| 7,268,791 B1* | 9/2007 | Jannink | G06F 17/30994 345/440 |
| 2003/0154212 A1* | 8/2003 | Schirmer | G06Q 10/107 |
| 2011/0258233 A1* | 10/2011 | Unger | G06F 17/30457 707/783 |
| 2012/0246174 A1* | 9/2012 | Spears | G06Q 30/02 707/749 |
| 2012/0290518 A1* | 11/2012 | Flinn | G06N 5/048 706/12 |

* cited by examiner

*Primary Examiner* — Scott Baderman
*Assistant Examiner* — Steven Golden
(74) *Attorney, Agent, or Firm* — Jones Day (57) ABSTRACT

Representative implementations provide devices and techniques for adding a field to a business object. One or more fields from similar business objects may be presented for selection as templates for the new field. The one or more fields and the similar business objects are determined by calculating an affinity value between the business object and other business objects.

20 Claims, 5 Drawing Sheets

AFFINITY-BASED INTELLIGENCE PROMPTER

BACKGROUND

To cover customers' business requirements to the fullest, many enterprise-level business applications, such as relational database applications for example, provide field extensibility. For example, the applications provide for users (such as business consultants or client-users, for instance) to at least partly customize the basic business objects (e.g., master data, transaction data, settings/configuration objects, etc.) of the enterprise-level application. In some cases, customization includes editing and/or adding fields to the business objects.

In some cases, the procedures for properly editing or adding fields to business objects may not be convenient or easily understood by mainstream client-users or by technical end-users. For instance, in many cases the user is prompted to enter technical meta information associated to the field during adding or editing the field, which often cannot be done without a clear understanding of the meta information. Since the meta information can define the field (including its properties and attributes) and can contribute to validation of the field, it can include complex expressions or value sets. Accordingly, entering the meta information can be tedious and error-prone even if it is well understood.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Various techniques and systems for adding a field to a business object are disclosed, according to example embodiments. For ease of discussion, the disclosure describes the various techniques with respect to business objects associated to a relational database application, and to enterprise-level business applications. However, the descriptions are also applicable to other applications, systems, data management operations, and the like, in other computing environments, networks, other forms and types of computing models, and the like.

In one embodiment, techniques and systems are employed to present one or more fields from similar business objects (e.g., similar to the edited business object) for selection as templates (e.g., stencils, guides, models, patterns, etc.) for adding a new field to a business object. The one or more fields and the similar business objects are determined by calculating an affinity value between the target (e.g., edited) business object and other business objects associated with the relational database application.

Various techniques for intelligently adding a field to a business object are disclosed. The discussion herein is intended to illustrate example components and techniques which may be utilized, but the examples described are not intended to be limiting. In various implementations, fewer, alternate, or additional components may be included to perform various portions of described techniques while remaining within the scope of the disclosure.

Figure 1:
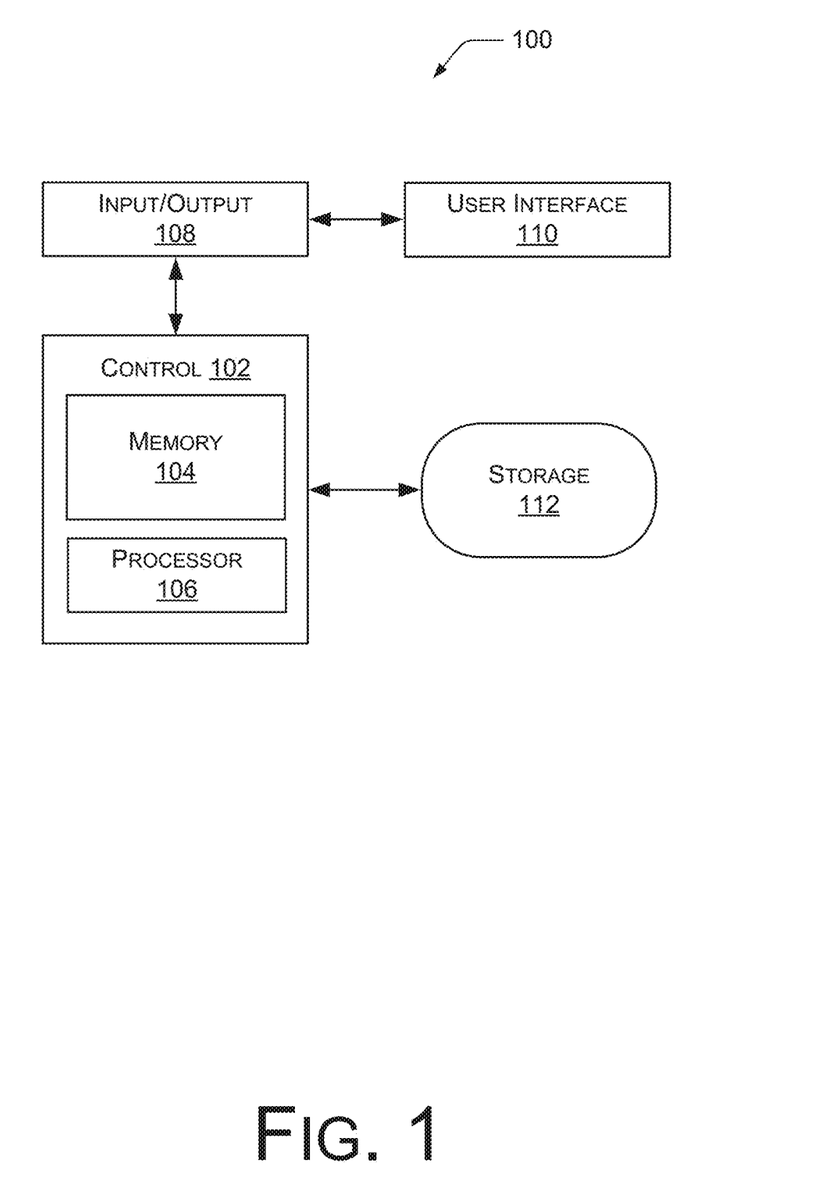
FIG. 1 is a block diagram of an example prompter system.

FIG. 1 shows an example of a prompter system 100 wherein the techniques and devices discussed herein may be implemented. In the example, the system 100 uses a control module 102, for example, to automatically provide one or more fields from similar business objects for selection as templates for adding a new field to a target (e.g., edited) business object. As shown in FIG. 1, the control module 102 may include a memory 104 and one or more processors 106, as are described further below. In various embodiments, the system 100 includes an input/output (I/O) module 108, a user interface (UI) 110, and may also include a storage component 112.

Figure 2:
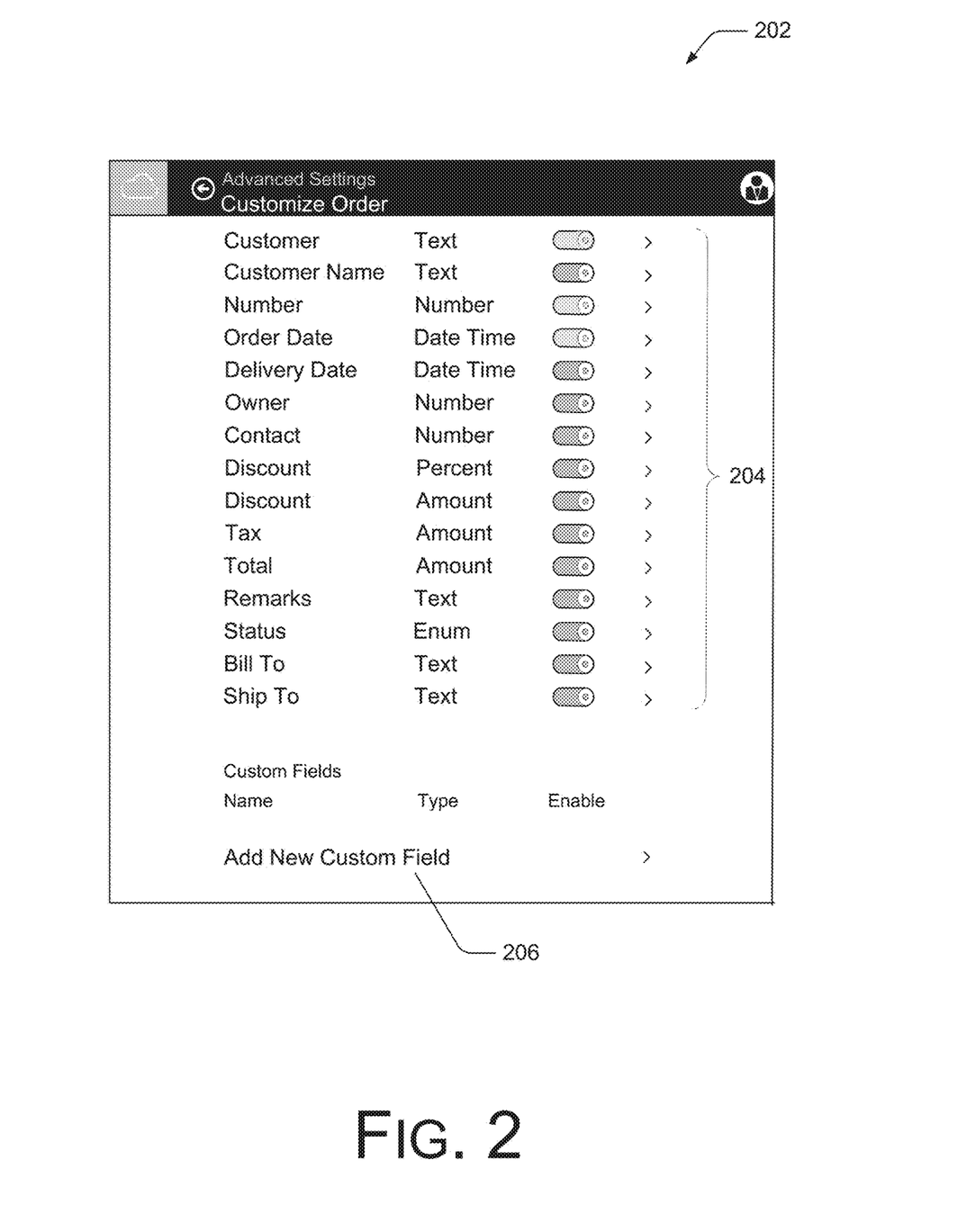
FIG. 2 is a diagram illustrating an example view of a business object, showing example fields of the business object.

In an implementation, the control module 102 is arranged to calculate an affinity value of the edited business object to another business object. For example, the affinity value is a numerical value indicating a degree of similarity (or difference) of the edited business object to the other business object. FIG. 2 is a diagram illustrating an example view of a business object 202 (as displayed on the user interface 110, for example) which may be associated with a relational database application, for example.

The illustration of FIG. 2 includes example fields 204 of the business object 202. In an example, it may be desirable to add an additional field 204 to the business object 202. Another business object 202 having a high affinity value may include many of the same fields 204, field validations, and the like. Another business object 202 having a lesser affinity may have few or none of the same fields 204, field validations, etc.

In the implementation, the control module 102 determines one or more fields 204 of another similar (e.g., high affinity value) business object 202 as prospective field templates, based on the affinity value. In various implementations, the control module 102 may use one or more threshold affinity values to determine the one or more fields to be used as prospective field templates, as described below. In various examples, the threshold values may be predetermined, pre-selected, user-selectable, user-editable, and the like, to achieve the desired performance (e.g., number of field templates displayed, etc.).

In an example, the control module 102 is arranged to calculate an affinity value of the edited business object 202 to multiple business objects 202 (one affinity value per business object) and to rank each of the multiple business objects 202 by their calculated affinity value. Thus, additional prospective field templates may be available for selection and copying to the new field.

In an implementation, the control module 102 is arranged to calculate an updated affinity value of the edited business object 202 to at least one of the multiple business objects 202 when there is a change to one or more fields 204 of the edited business object 202 or a change to one or more fields 204 of the other business objects 202. Thus, the affinity values may be dynamic, changing as edits or additions are made to business objects 202 and/or their fields 204. Further, in an implementation, the affinity values are not commutative; meaning the affinity of a business object A to a business object B is not equal to the affinity of the business object B to the business object A. Accordingly, in some implementations, the affinity value(s) are calculated just prior to use or at the time of use.

In an implementation, the input/output module 108 is arranged to receive an input to add a new field to a business object. For example, referring to FIG. 2, a user for instance, may activate a control (such as the "Add New Custom Field" control at 206, or the like) to trigger the addition of a new field to the business object 202.

Figure 3:
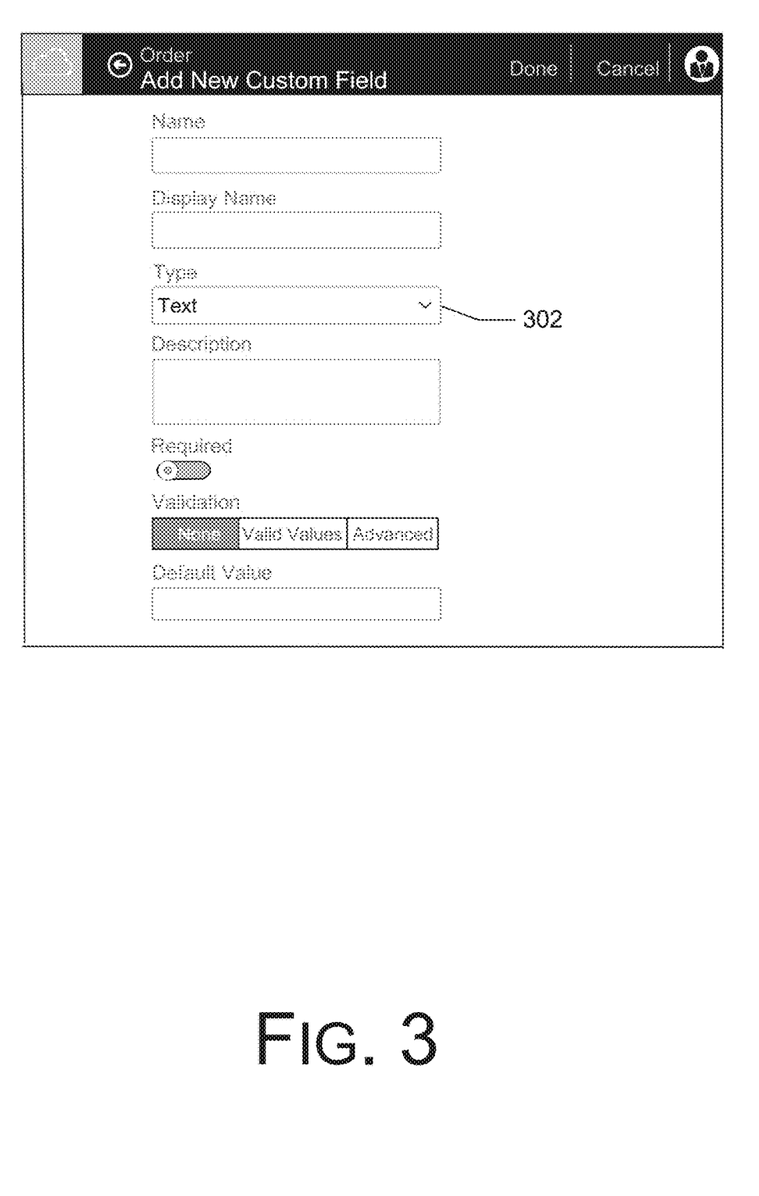
FIG. 3 is a diagram illustrating an example user interface window for adding a field to a target business object.

FIG. 3 is a diagram illustrating an example user interface window for adding a field 204 to a target business object 202, according to an example embodiment. The example user interface window of FIG. 3 can be displayed on the user interface 110, for example.

In an implementation, the user interface 110 is arranged to display the one or more prospective field templates 302 for selection. In the example shown in FIG. 3, a single field template 302 (labelled "Text") is available for selection. In various other examples, the quantity of available field templates 302 for selection may include as many as is practical and efficient (e.g., 2, 5, 10, etc.). In other examples, the quantity of available field templates 302 for selection may be determined by rules, such as those discussed in this disclosure relative to a threshold affinity value.

In one implementation, the user interface 110 is arranged to display at least one prospective field template 302 from one or more of the multiple business objects 202 in an order according to the affinity ranking of the business objects 202. In the implementation, the prospective field template(s) 302 are displayed when an affinity value associated with each of their multiple business objects 202 exceeds a threshold value.

Figure 4:
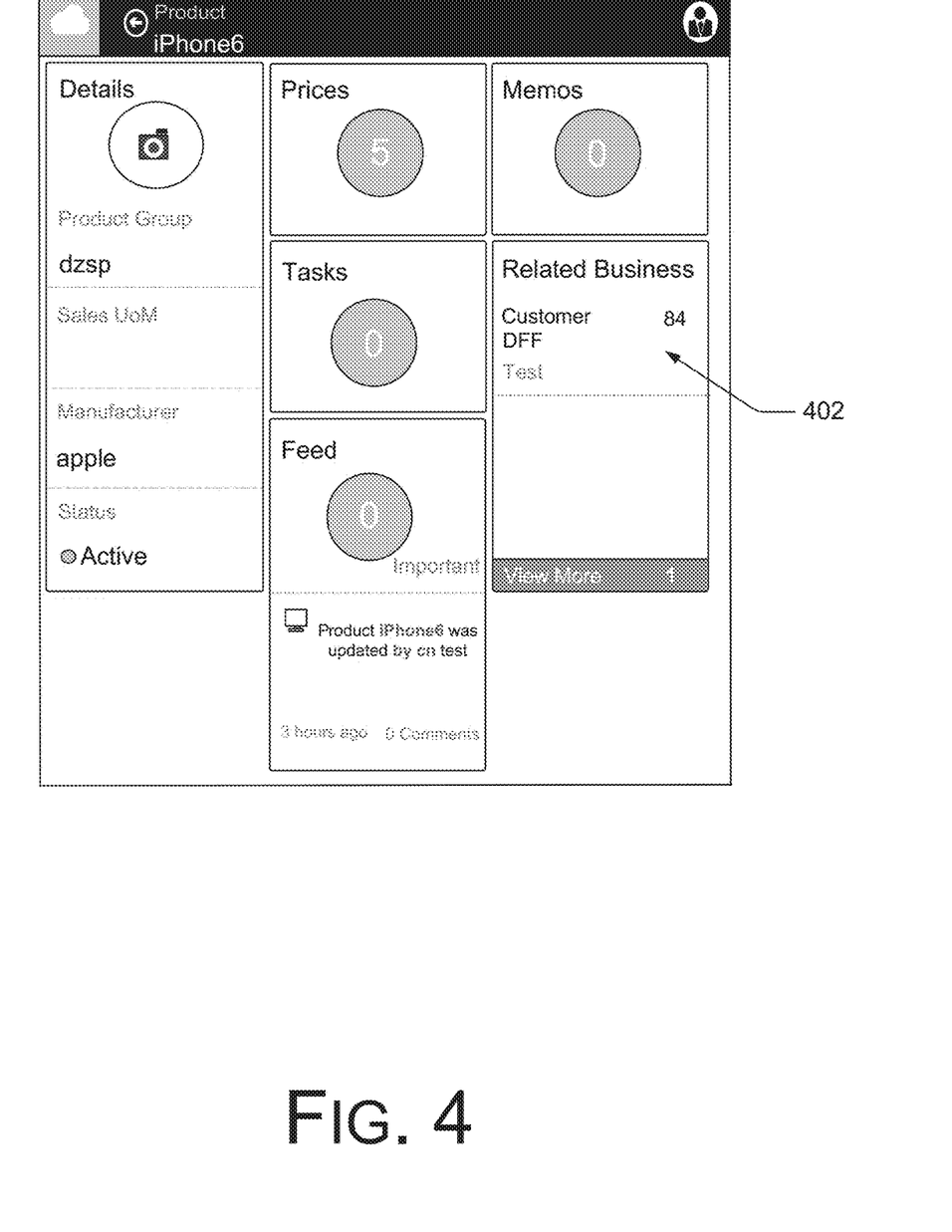
FIG. 4 is a diagram of an example target business object, including example business objects with high affinity.

In another implementation, the user interface 110 is arranged to display which of the other business objects 202 has the greatest affinity to the edited business object 202. For example, in FIG. 4 at 402, the business object 202 "Customer" is displayed as having the greatest affinity to the edited business object 202 "Product." In other implementations, the user interface 110 may display multiple business objects 202 and their associated affinity values, or the like.

In an implementation, the user interface 110 is arranged to receive a selection to copy one of the prospective field templates 302 to the new field 204. In other words, the selection of which prospective field template 302 to copy may be made via the user interface 110. In various embodiments, the user interface 110 may include a combination of display and input device (e.g., touchscreen, etc.) or any of a multitude of separate display and input devices (e.g., stylus, keyboard, mouse, etc.), or the like.

In an implementation, the control module 102 is arranged to copy the selected field template 302 to the new field 204 and to copy attributes, properties, and/or validations associated with the selected field templates 302 to the new field 204. In the implementation, the user interface 110 is arranged to display the attributes, properties, and/or validations copied to the new field 204 for editing. For example, once the new field 204 is created, by copying one of the field templates 302, the new field 204 may be edited as desired.

Figure 5:
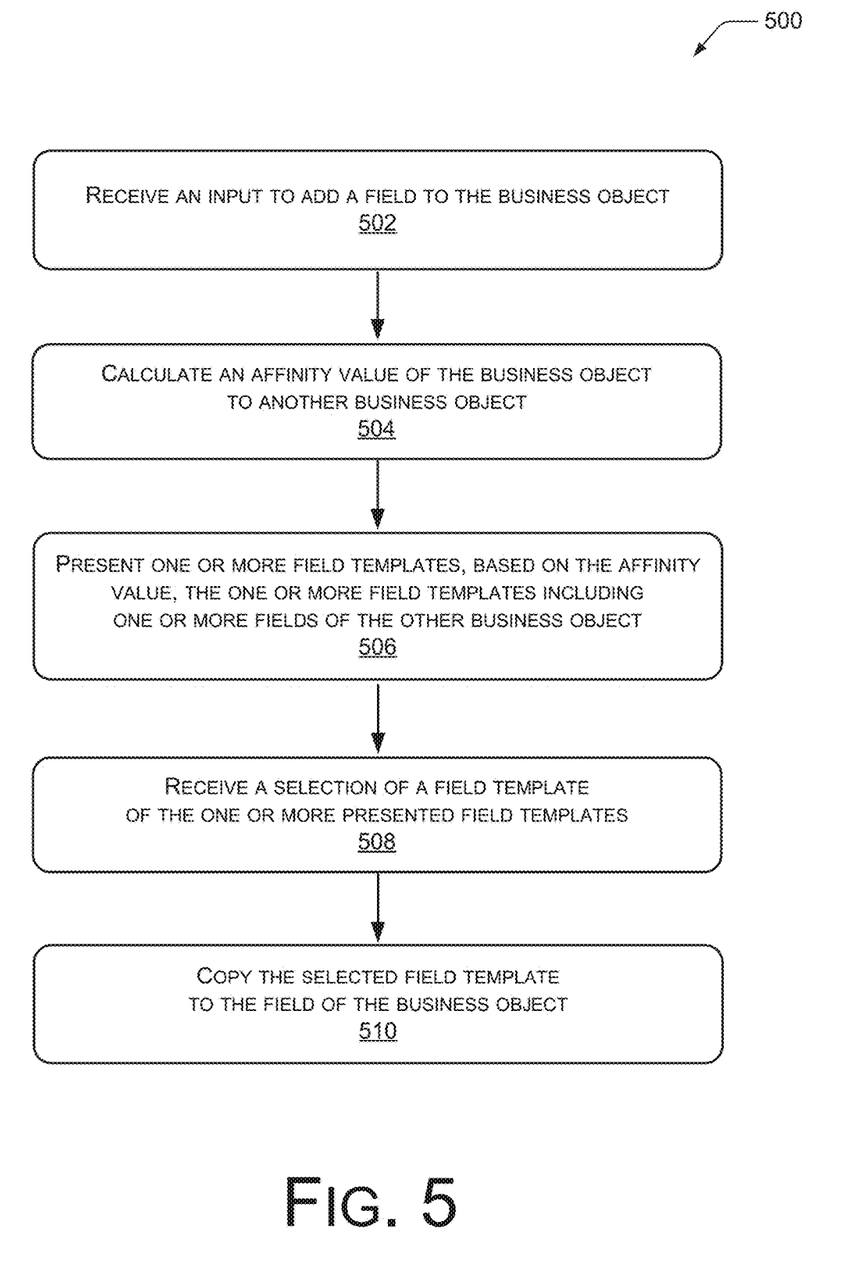
FIG. 5 is a flow diagram illustrating an example process for adding a field to a business object.

In alternate embodiments, the system 100 may include fewer or additional components, within which differently arranged structures may perform the techniques discussed within the disclosure. An example process of adding a new field 204 to a business object 202 is described further in the description of process 500 below.

Portions of the subject matter of this disclosure can be implemented as a system, method, apparatus, or article of manufacture using standard programming and/or engineering techniques to produce software, firmware, hardware or any combination thereof to control a computer or processor (such as processor 106, for example) to implement the disclosure. For example, portions of an example system 100 may be implemented using any form of computer-readable media (shown as memory 104 in FIG. 1, for example) that is accessible by the processor 106. Computer-readable media may include, for example, computer storage media and communications media.

Computer-readable storage media includes volatile and non-volatile, removable and non-removable media implemented in any method or technology for storage of information such as computer-readable instructions, data structures, program modules or other data. Memory 104 is an example of computer-readable storage media. Storage 112, which may include network or cloud storage, for example, is another example of computer-readable storage media. Additional types of computer-readable storage media that may be present include, but are not limited to, RAM, ROM, EEPROM, flash memory or other memory technology, CD-ROM, digital versatile disks (DVD) or other optical storage, magnetic disks or other magnetic storage devices, or any other medium which may be used to store the desired information and which may accessed by the processor 106.

In contrast, communication media typically embodies computer readable instructions, data structures, program modules, or other data in a modulated data signal, such as a carrier wave, or other transport mechanism.

While the subject matter has been described above in the general context of computer-executable instructions of a computer program that runs on a computer and/or computers, those skilled in the art will recognize that the subject matter also may be implemented in combination with other program modules. Generally, program modules include routines, programs, components, data structures, and the like, which perform particular tasks and/or implement particular abstract data types.

Moreover, those skilled in the art will appreciate that the innovative techniques can be practiced with other computer system configurations, including single-processor or multi-processor computer systems, mini-computing devices, mainframe computers, as well as personal computers, hand-held computing devices, microprocessor-based or programmable consumer or industrial electronics, and the like. The illustrated aspects may also be practiced in distributed computing environments where tasks are performed by remote processing devices that are linked through a communications network. However, some, if not all aspects of the disclosure can be practiced on stand-alone computers. In a distributed computing environment, program modules may be located in both local and remote memory storage devices.

FIG. 5 is a flow diagram illustrating an example process 500 for intelligently adding a field (such as field 204, for example) to a business object (such as business object 202, for example), according to an implementation. In various implementations, the business object may be associated to a relational database application, or the like. The process 500 describes automatically and intelligently presenting one or more fields (such as fields 302, for example) from similar business objects as templates for the new field. For example, an affinity value may be calculated and used to determine similar business objects. The process 500 is described with reference to FIGS. 1-4.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented with any suitable components, or combinations thereof, without departing from the scope of the subject matter described herein.

At block 502, the process 500 includes receiving an input to add a field to the business object. In an implementation, the input is received from a user interface (such as UI 110, for example) via an input/output module (such as I/O module 108, for example). For instance, a user may select to add a new field to the business object by activating a control of the user interface 110, triggering the input via the input/output module 108.

At block 504, the process 500 includes calculating an affinity value of the business object to another business object. In an implementation, the affinity value includes a numerical value indicating a degree of similarity of the business object to the other business object. For example, the degree of similarity can be based on the business object having one or more common fields and/or one or more common validations with the other business object.

In an implementation, the process 500 includes calculating an affinity value of the business object to multiple business objects. In one example, the process includes ranking each of the multiple business objects by their associated affinity value.

In one implementation, the process includes calculating the affinity value based on a formula:

$$\text{affinity}(BO_{target}, BO_{source}) = \text{factor} \times \text{initial\_affinity} + (1 - \text{factor}) \times \text{similarity}(BO_{target}, BO_{source})$$

wherein: $BO_{target}$ represents the business object, $BO_{source}$ represents the other business object(s) (on an individual basis—that is, the formula is applied one business object at a time), factor represents a predefined or configurable efficiency rating based on a business environment of the business object, initial_affinity represents a predefined initial affinity value of the business object to the other business object(s) based on the business environment, and similarity ($BO_{target}$, $BO_{source}$) represents a similarity value between the business object and the other business object(s), based on fields that the business object and the other business object(s) have in common.

In an implementation, the values for factor and initial_affinity may include any value between and including 0 and 1. These efficiency rate values may be determined based on the business environment and the business relationship of the business objects.

In an implementation, the degree of similarity is based on whether the business object has common field types and/or common validation types with respect to each of the multiple other business objects. For example, in an implementation, the process includes calculating similarity ($BO_{target}$, $BO_{source}$) based on a formula:

$$\text{similarity}(BO_{target}, BO_{source}) = \frac{\text{same\_type\_count} \times \text{same\_validation\_count}}{\text{amount of } BO_{target} \text{ fields}^2}$$

wherein same_type_count represents a quantity of fields where the business object and the other business object have a common type and same_validation_count represents a quantity of fields wherein the business object and the other business object use a common validation.

In some implementations, an affinity value of the business object to each of the multiple other business objects changes when changes are made to fields of the business objects (including added fields to business objects). For instance, an affinity value of the business object to each of the multiple other business objects changes when the new field is added to the business object. The control module 102, for example, may be arranged to calculate an updated affinity value of the business object to at least one of the multiple business objects when there is a change (including an added field) to one or more fields of the business object or a change to one or more fields of an identified one of the multiple business objects.

In an implementation, the process 500 includes ranking each of the multiple other business objects by associated affinity value. Accordingly, the affinity values (as well as the values for similarity, above) may be calculated (or recalculated) just prior to their use or at the time of use.

In an implementation, the process 500 includes suggesting (e.g., displaying on a user interface, etc.) one or more field templates to be used (e.g., copied) to create the new field for the edited business object. At block 506, the process 500 includes presenting one or more field templates (such as field templates 302, for example), based on the affinity value(s), where the one or more field templates include one or more fields of the other business object(s) that do not exist for the edited business object. For example, fields that exist for similar (e.g., high affinity value) business objects but do not exist at the edited business object are suggested as templates for the new field.

In an implementation, the field template(s) from the similar business objects are presented based on the ranking of the affinity values. Accordingly, fields from additional similar business objects may be presented in a priority order to fields from less similar business objects.

In another implementation, the process 500 includes presenting multiple field templates from one or more of the multiple business objects when an affinity value associated with each of the one or more of the multiple business objects exceeds a threshold value. For example, in the implementation, the field templates from business objects having at least a threshold affinity to the edited business object are presented. Again, the multiple field templates may be presented in an order based on the affinity value associated with each of the one or more of the multiple business objects (e.g., greatest to least, etc.).

In an implementation, the process includes presenting at least one field template from one of multiple business objects when an affinity value associated with the one of the multiple business objects is greatest. In other words, in an example, the field templates from the business object having the most similarity (e.g., greatest affinity) to the edited business object are presented, and field templates from other less-similar business objects may not be presented. In another implementation, the process 500 includes not presenting a field template from the multiple business objects when an affinity value associated with each of the multiple business objects is less than a threshold value. In that case, no template is presented for creating the new field.

In alternate implementations, other rules may be possible with regard to a threshold value, or the like. In various embodiments, the threshold values, as well as the affinity values, and the like, may be stored in the memory 104 or the storage 112, or the like. For example, the threshold values may be stored in an XML-based configuration file, or like mechanism.

In an implementation, the presenting includes displaying the one or more field templates via a pop-up window or a drop-down list on a user interface of a display device. For example, the field templates may be displayed on the user interface 110 in an order based on the affinity ranking of the associated business objects.

At block 508, the process 500 includes receiving a selection of a field template of the one or more presented field templates. For example, the process 500 includes receiving an input from the user interface 110, via the input/output module 108, a selection of a field template of the one or more displayed field templates.

At block 510, the process 500 includes copying the selected field template and associated field properties to the field of the edited business object. Associated field properties may include attributes, properties, validations, rules, limits, and the like, that define, describe, or otherwise embody the field. Accordingly, the new field is a copy of the selected field template. In an implementation, the process 500 includes opening (e.g., including displaying on the user interface) the copied field template for editing of any or all of the copied properties of the field.

In various implementations, one or more computer readable storage media (as described above) include computer executable instructions that, when executed by a computer processor, direct the computer processor to perform operations including at least a portion of the process 500.

In alternate implementations, other techniques may be included in the process in various combinations, and remain within the scope of the disclosure.

Although implementations have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations. For example, the methodological acts need not be performed in the order or combinations described herein, and may be performed in any combination of one or more acts.

What is claimed is:

1. A non-transitory computer-readable storage media, having computer-executable instructions stored thereon, that when executed, cause a computer processor to initiate:
   receiving a first input to add a new field to a target business object associated to a relational database;
   calculating an affinity value of the target business object to each of multiple other business objects associated to the relational database, the affinity value comprising a numerical value indicating a degree of similarity of the target business object to each of the multiple other business objects, wherein the calculation of the affinity value is based at least in part on
      a quantity of fields of a common type between the target business object and each of the multiple other business objects, and
      a quantity of fields using a common validation between the target business object and each of the multiple other business objects;
   determining at least one of the multiple other business objects with an affinity value that exceeds a threshold affinity value;
   displaying one or more fields from the at least one of the multiple other business objects which is not existent at the target business object as one or more field templates for adding a new field to the target business object in response to the determination that the least one of the multiple other business objects has an affinity value that exceeds the threshold affinity value;
   receiving a second input selecting a field template of the one or more displayed field templates; and
   copying the selected field template and associated field properties to the new field of the target business object.

2. The computer-readable storage media of claim 1, wherein the degree of similarity is based on whether the target business object has common field types and/or common validation types with respect to each of the multiple other business objects.

3. The computer-readable storage media of claim 1, wherein the affinity value of the target business object to each of the multiple other business objects changes when the new field is added to the target business object.

4. A system, comprising:
   a non-transitory memory device for storing computer-readable program code; and
   a processor in communication with the memory device, the processor being operative with the computer-readable program code to implement
   an input/output module arranged to receive an input to add a new field to a target business object;
   a control module arranged to calculate an affinity value of the target business object to another business object, and to determine one or more fields of the other business object which is not existent at the target business object as prospective field templates for adding to the new field of the target business object, based on the affinity value, the control module performs calculation of the affinity value based at least in part on
      a quantity of fields of a common type between the target business object and the other business object, and
      a quantity of fields using a common validation between the target business object and the other business object; and
   a user interface arranged to display the one or more prospective field templates for selection, and to receive a selection to copy one of the one or more prospective field templates to the new field of the target business object.

5. The system of claim 4, wherein the control module is arranged to calculate the affinity value of the target business object to multiple business objects and to rank each of the multiple business objects by the calculated affinity value.

6. The system of claim 5, wherein the user interface is arranged to display at least one prospective field template from one or more of the multiple business objects in an order according to the ranking, when an affinity value associated with each of the one or more of the multiple business objects exceeds a threshold value.

7. The system of claim 5, wherein the control module is arranged to calculate an updated affinity value of the target business object to at least one of the multiple business objects when there is a change to one or more fields of the target business object or a change to one or more fields of the at least one of the multiple business objects.

8. The system of claim 4, wherein the control module is arranged to copy the one of the one or more prospective field templates to the new field and to copy attributes, properties, and/or validations associated with the one of the one or more prospective field templates to the new field.

9. The system of claim 8, wherein the user interface is arranged to display the attributes, properties, and/or validations copied to the new field for editing.

10. A method of adding a field to a target business object, comprising:
- receiving an input to add a field to the target business object;
- calculating an affinity value of the target business object to another business object, wherein the calculation of the affinity value is based at least in part on
  - a quantity of fields of a common type between the target business object and the other business object, and
  - a quantity of fields using a common validation between the target business object and the other business object;
- presenting one or more fields from the other business object which is not existent at the target business object as field templates for adding to the new field of the target business object, based on the affinity value;
- receiving a selection of a field template of the one or more presented field templates; and
- copying the selected field template to the field of the target business object.

11. The method of claim 10, further comprising opening the copied field template for editing of properties of the field.

12. The method of claim 10, wherein the affinity value comprises a numerical value indicating a degree of similarity of the target business object to the other business object, the degree of similarity based on the target business object having one or more common fields and/or one or more common validations with the other business object.

13. The method of claim 10, wherein the presenting includes displaying the one or more field templates via a pop-up window or a drop-down list on a user interface of a display device.

14. The method of claim 10, further comprising calculating the affinity value based on a formula:

$$\text{affinity}(BO_{target}, BO_{source}) = \text{factor} \times \text{initial\_affinity} + (1 - \text{factor}) \times \text{similarity}(BO_{target}, BO_{source})$$

wherein:
$BO_{target}$ represents the target business object, $BO_{source}$ represents the other business object, factor represents a predefined or configurable efficiency rating based on a business environment of the target business object, initial_affinity represents a predefined initial affinity value of the target business object to the other business object based on the business environment, and similarity($BO_{target}$,$BO_{source}$) represents a similarity value between the target business object and the other business object, based on fields that the target business object and the other business object have in common.

15. The method of claim 14, further comprising calculating the similarity($BO_{target}$,$BO_{source}$) based on a formula:

$$\text{similarity}(BO_{target}, BO_{source}) = \frac{\text{same\_type\_count} \times \text{same\_validation\_count}}{\text{amount of } BO_{target} \text{ fields}^2}$$

wherein same_type_count represents a quantity of fields, wherein the target business object and the other business object have a common type and same_validation_count represents a quantity of fields wherein the target business object and the other business object use a common validation.

16. The method of claim 10, further comprising calculating an affinity value of the target business object to multiple business objects, ranking each of the multiple business objects by associated affinity value, and presenting at least one field template from the multiple business objects based on the ranking.

17. The method of claim 16, further comprising presenting the at least one field template from one of the multiple business objects when an affinity value associated with the one of the multiple business objects is greatest.

18. The method of claim 16, further comprising not presenting a field template from the multiple business objects when an affinity value associated with each of the multiple business objects is less than a threshold value.

19. The method of claim 16, further comprising presenting multiple field templates from one or more of the multiple business objects when an affinity value associated with each of the one or more of the multiple business objects exceeds a threshold value.

20. The method of claim 19, further comprising presenting the multiple field templates in an order based on the affinity value associated with each of the one or more of the multiple business objects.

* * * * *